United States Patent
Brackett et al.

(10) Patent No.: US 11,429,657 B2
(45) Date of Patent: Aug. 30, 2022

(54) MOBILE DEVICE SMART MEDIA FILTERING

(71) Applicant: Verizon Patent and Licensing Inc., Arlington, VA (US)

(72) Inventors: Kerry E. Brackett, Andover, MA (US); Allison M. Forgues, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 750 days.

(21) Appl. No.: 14/484,346

(22) Filed: Sep. 12, 2014

(65) Prior Publication Data

US 2016/0078030 A1 Mar. 17, 2016

(51) Int. Cl.
| | |
|---|---|
| *G06F 16/40* | (2019.01) |
| *G06F 16/435* | (2019.01) |
| *H04L 67/52* | (2022.01) |
| *G06F 16/487* | (2019.01) |
| *G06F 16/9535* | (2019.01) |
| *G06F 16/9537* | (2019.01) |
| *H04W 4/029* | (2018.01) |
| *H04W 4/18* | (2009.01) |

(Continued)

(52) U.S. Cl.
CPC ......... *G06F 16/435* (2019.01); *G06F 16/487* (2019.01); *G06F 16/9535* (2019.01); *G06F 16/9537* (2019.01); *H04L 67/18* (2013.01); *H04L 67/2804* (2013.01); *H04W 4/029* (2018.02); *H04W 4/185* (2013.01); *H04L 67/289* (2013.01)

(58) Field of Classification Search
CPC ......... G06F 17/30029; G06F 17/30041; G06F 17/30867; G06F 17/3087; G06F 17/30784; G06F 17/30044; G06F 17/30047; G06F 17/30; G06F 17/30091; G06F 17/30106; G06F 17/3012; H04N 21/4184; H04N 21/4223; H04N 21/84; G06K 9/00677; G06K 9/00288; G06K 9/00711; G06K 9/6201; G06K 2009/00328; G06K 9/00295; G06K 9/00221; G06K 9/6267; G06K 9/00744; G06Q 50/01
See application file for complete search history.

(56) References Cited

U.S. PATENT DOCUMENTS 9,531,823 B1 * 12/2016 Suchland ............... H04W 4/023
2007/0112900 A1 * 5/2007 Arrouye ................. G06F 16/11
(Continued)

FOREIGN PATENT DOCUMENTS

EP 2018032 A1 * 1/2009 .......... H04M 1/2755

*Primary Examiner* — Augustine K. Obisesan

(57) ABSTRACT

A mobile device receives media files, and automatically tags each of the media files with tags, comprising data or meta-data, based on: 1) other mobile users proximate to the mobile device, 2) a current location of the mobile device, 3) facial recognition analysis applied to each of the first media files, 4) subject or content recognition analysis applied to each of the first media files, 5) a current date, and/or 6) a usage history associated with each of the first media files. The mobile device stores the tagged media files, and receives a user request to search the media files. The mobile device searches the tags, responsive to the user request, to generate a filtered set of media files, and presents the filtered set of media files to a user of the mobile device.

20 Claims, 12 Drawing Sheets

(51) Int. Cl.
*H04L 67/561* (2022.01)
*H04L 67/289* (2022.01)

(56) References Cited

U.S. PATENT DOCUMENTS

| | | | | |
|---|---|---|---|---|
| 2007/0232347 A1* | 10/2007 | Persson | ............... | H04L 51/20 455/550.1 |
| 2007/0293265 A1* | 12/2007 | Fei | ............... | G06F 17/241 455/556.1 |
| 2008/0052349 A1* | 2/2008 | Lin | ............... | H04N 1/00132 709/203 |
| 2008/0079573 A1* | 4/2008 | Bloebaum | ............... | H04B 5/0031 340/568.1 |
| 2008/0112598 A1* | 5/2008 | Gabara | ............... | G10L 17/00 382/116 |
| 2008/0194270 A1* | 8/2008 | Greenberg | ............... | G06F 17/30265 455/456.1 |
| 2009/0113315 A1* | 4/2009 | Fisher | ............... | G06F 17/30967 715/758 |
| 2009/0249222 A1* | 10/2009 | Schmidt | ............... | H04N 21/2368 715/751 |
| 2009/0313544 A1* | 12/2009 | Wood | ............... | G06F 3/048 715/716 |
| 2010/0191728 A1* | 7/2010 | Reilly | ............... | H04N 1/00167 707/736 |
| 2010/0211535 A1* | 8/2010 | Rosenberger | ............... | G06F 17/30038 706/20 |
| 2010/0211575 A1* | 8/2010 | Collins | ............... | G06F 17/30044 707/749 |
| 2010/0217794 A1* | 8/2010 | Strandell | ............... | H04L 67/2804 709/203 |
| 2011/0165888 A1* | 7/2011 | Shuman | ............... | H04W 4/02 455/456.1 |
| 2011/0173337 A1* | 7/2011 | Walsh | ............... | H04W 4/023 709/229 |
| 2011/0209221 A1* | 8/2011 | Hanson | ............... | G06F 16/78 726/26 |
| 2011/0243449 A1* | 10/2011 | Hannuksela | ............... | G06K 9/00221 382/190 |
| 2012/0046050 A1* | 2/2012 | Hymel | ............... | H04W 4/029 455/456.3 |
| 2012/0076367 A1* | 3/2012 | Tseng | ............... | G06K 9/00288 382/118 |
| 2012/0200737 A1* | 8/2012 | Jape | ............... | H04N 5/772 348/231.2 |
| 2012/0221687 A1* | 8/2012 | Hunter | ............... | G06F 16/435 709/219 |
| 2012/0250950 A1* | 10/2012 | Papakipos | ............... | G06F 17/30247 382/118 |
| 2013/0138438 A1* | 5/2013 | Bachtiger | ............... | G06F 16/48 704/235 |
| 2013/0282438 A1* | 10/2013 | Hunter | ............... | G01S 1/02 705/7.32 |
| 2014/0003652 A1* | 1/2014 | Fedorovskaya | ... | G06F 17/30286 382/103 |
| 2014/0181089 A1* | 6/2014 | Desmond | ............... | G06F 17/30268 707/722 |
| 2014/0188997 A1* | 7/2014 | Schneiderman | ............... | H04L 51/32 709/204 |
| 2014/0206382 A1* | 7/2014 | Shabtay | ............... | G01S 5/0284 455/456.1 |
| 2014/0280390 A1* | 9/2014 | Bubash | ............... | G06F 17/30123 707/821 |
| 2014/0304019 A1* | 10/2014 | Scott | ............... | G06Q 10/063114 705/7.15 |
| 2014/0350924 A1* | 11/2014 | Zurek | ............... | G10L 15/22 704/231 |
| 2014/0375752 A1* | 12/2014 | Shoemake | ............... | G06F 3/011 348/14.07 |
| 2015/0213305 A1* | 7/2015 | Sundstrom | ............... | G06K 9/00281 382/118 |
| 2015/0350729 A1* | 12/2015 | Reynolds | ............... | H04N 21/25891 725/34 |
| 2016/0277876 A1* | 9/2016 | Li | ............... | H04W 76/14 |

* cited by examiner

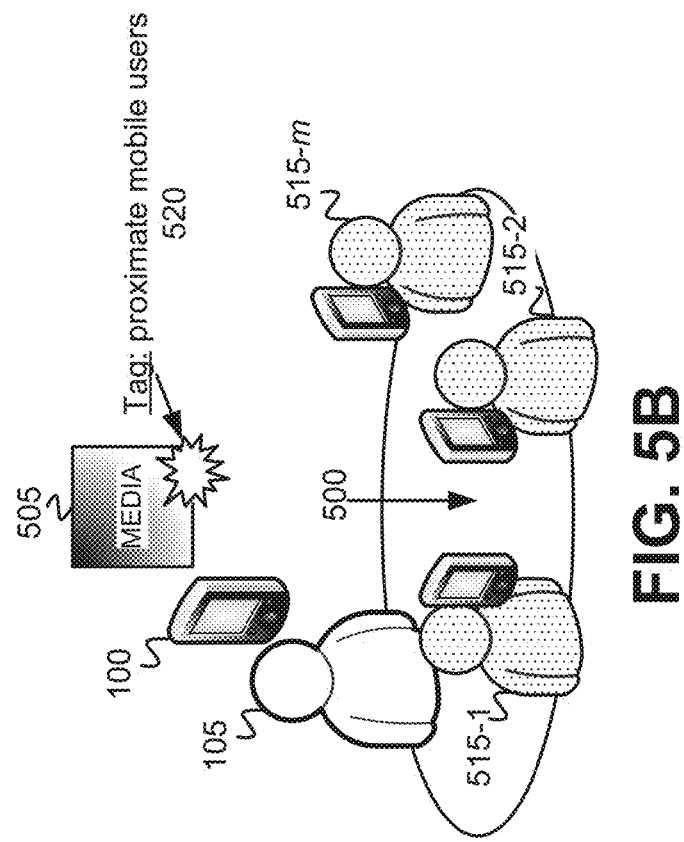
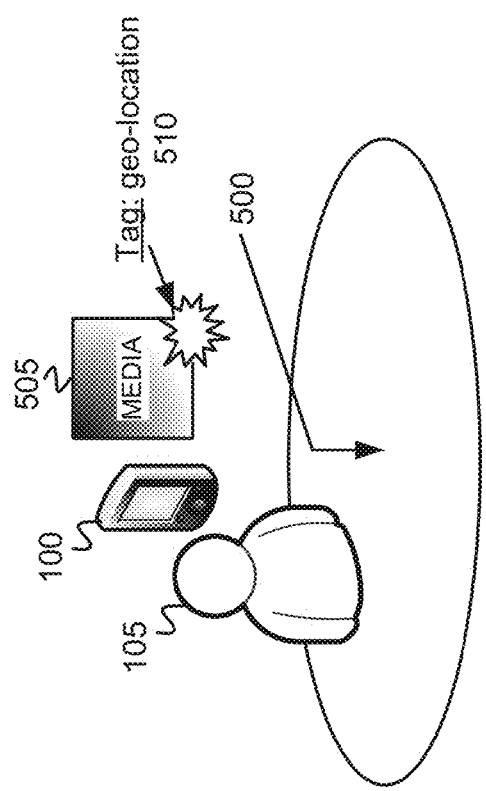

MOBILE DEVICE SMART MEDIA FILTERING

BACKGROUND

Cameras are ubiquitous in modern digital devices, such as, for example, digital cameras or cellular telephones. Device users who use such cameras extensively often accumulate, over time, an extensive collection of media files, such as images, audio media or video media that are stored locally in the mobile device, or in an external device such as a laptop or in cloud storage. Having a heavily populated media collection makes it very difficult for a device user to find a specific media file among the files in the collection.

BRIEF DESCRIPTION OF THE DRAWINGS

FIGS. 5A-5D are diagrams that depict examples of the mobile device of FIG. 1 tagging a media file based on obtained data or meta-data;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
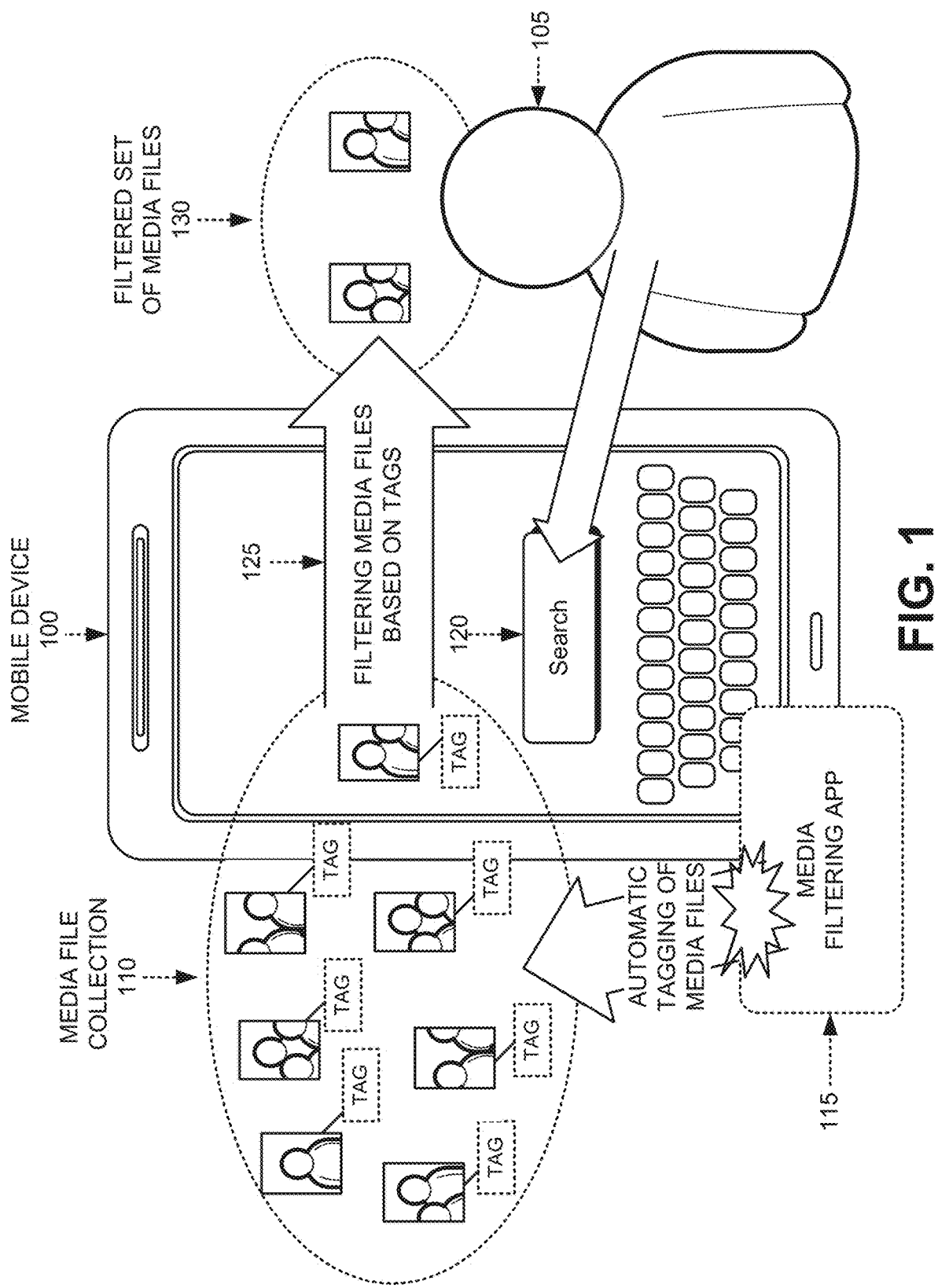
FIG. 1 is a diagram that depicts an overview of smart media filtering performed at a mobile device according to exemplary embodiments.

As described herein, a media filtering application, installed at mobile devices, performs a smart media tagging and filtering process that enables mobile users to more quickly and easily locate a media file, for which they are looking, on their mobile device. FIG. 1 is a diagram that depicts an overview of the smart media tagging and filtering performed at a mobile device according to embodiments described herein. As shown, a user 105 of a mobile device 100 may accumulate a collection 110 of media files at mobile device 100. The media files of collection 110 may be created by user 105 using a camera (not shown) and/or a microphone (not shown) of mobile device 100, may be downloaded by user 105 from an external source (e.g., a network server or cloud storage), or may have been shared from another user. Each media file of collection 110 may include any type or format of digital image, any type or format of audio file, or any type or format of audio/video file.

A media filtering application (app) 115 may be installed on mobile device 100, and media filtering app 115 may continuously, or periodically, automatically tag each of the media files in collection 110 as the media files are accumulated. App 115 may tag each of the media items with data or meta-data that is associated with each media file in memory. App 115 may determine the data or meta-data to tag each media file based on, for example, 1) an identity of other mobile users that are proximate to mobile device 100, 2) a current location of mobile device 100 (e.g., at a time the media file was created at mobile device 100), 3) a determination of an identity of an individual(s) in the media file using facial and/or audio (e.g., voice) recognition analysis techniques applied to the media file, 4) a determination of subject or content of the media using subject/content analysis recognition techniques applied to the media file, 5) a current date, 6) a usage history of the media item, and/or 7) manually entered tags provided by user 105 or other users. App 115 may determine the data or meta-data to tag each media file based on one or more of 1) through 7) above (i.e., alone or in combination). For example, 2) and 3) may be used together to tag a media file with a current location of mobile device 100, and with the determined identities of one or more individuals in the media file. The data or meta-data to tag each media item may be determined at a time when the media item is created (e.g., when a picture or video is taken by mobile device 100), or at times subsequent to creation of the media item (e.g., when the media item is downloaded, when the media item is shared, etc.).

The media files of collection 110 may each be stored in memory along with their respective tag. Upon execution of a search 120 by user 105 via a user interface of mobile device 100, media filtering app 115 may search the data or metadata tag associated with each of the media files of collection 110 to filter 125 the media files based on the content of the tags. App 115 filters 125 the media files of collection 110 to generate a filtered set 130 of media files that includes a subset of media files of collection 110. The filtering 125 performed by app 115 may, for example, be based on 1) other identified mobile users that are proximate to mobile device 100 (e.g., at the time the filtering is performed), 2) a current location of mobile device 100 or a user-specified location, 3) a determination of an identity of an individual(s) in a vicinity of mobile device 100 using facial and/or audio (e.g., voice) recognition media analysis techniques, 4) a determination of a subject or content related to a vicinity of mobile device 100 using subject/content recognition media analysis techniques, 5) media usage history, and/or 6) a current or user-specified date or range of dates. The filtering 125 performed by app 115 may compare the data or metadata tags associated with each media file with other data obtained based on one or more of the filtering techniques of 1) through 6) above (e.g., any combination of 1) through 6) may be used). The filtered set 130 of media files, having a smaller set of media files than collection 110, may be more easily manually searched by user 105 to identify a specific media file of interest to user 105. For example, collection 110 may include 100 media files, and filtering 125 by app 115 may generate a filtered set 130 that includes only 3 media files.

Figure 2:
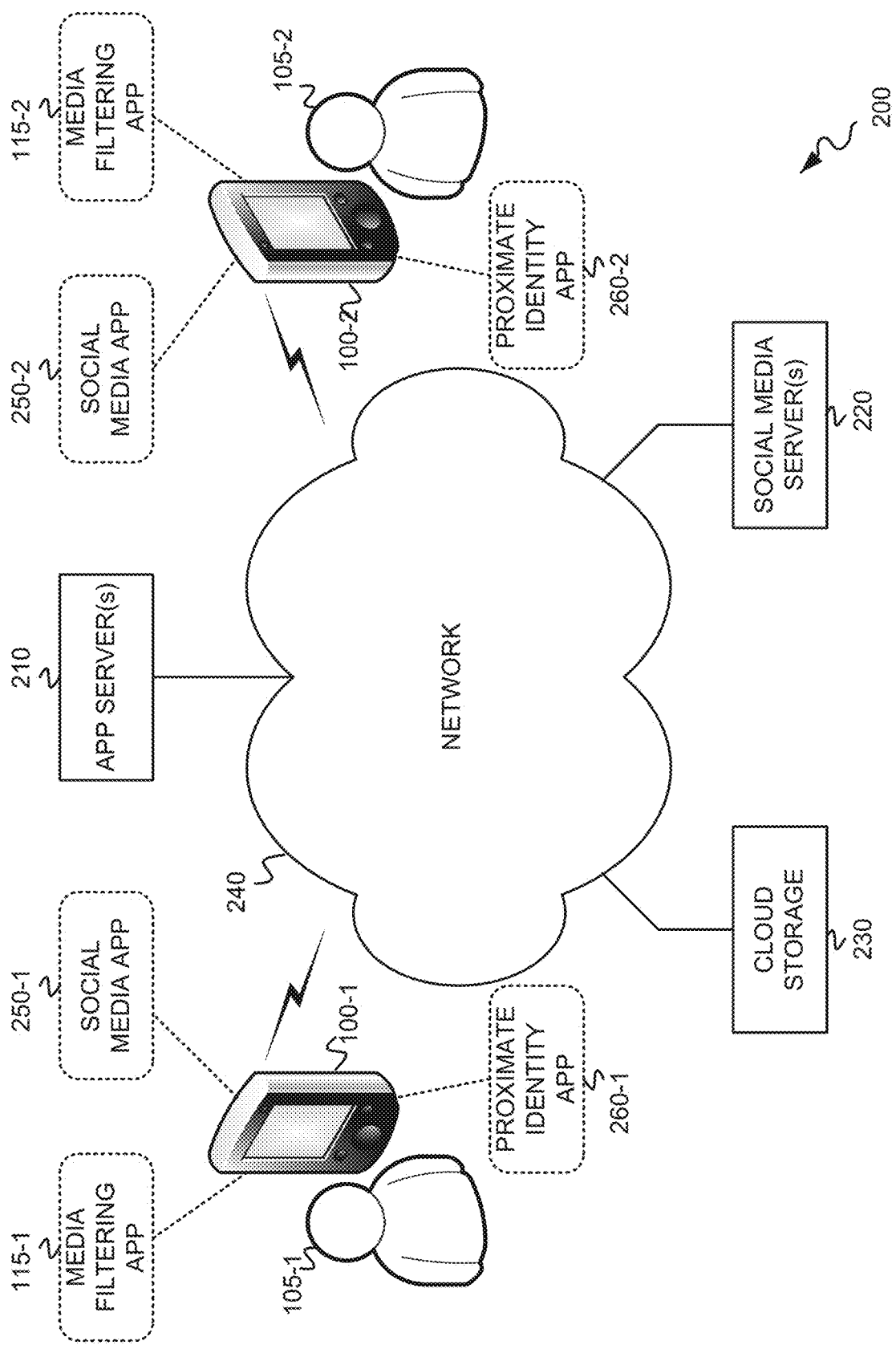
FIG. 2 is a diagram that depicts an exemplary network environment in which the smart media filtering of FIG. 1 may be implemented.

FIG. 2 is a diagram that depicts an exemplary network environment 200 in which the smart media filtering of FIG. 1 may be implemented. As shown, network environment 200 may include multiple mobile devices 100-1 and 100-2, an app server(s) 210, a social media server(s) 220, cloud storage 230, and a network 240.

A user 105-1 and 105-2 (generically and individually referred to herein as "user 105") may use (i.e., operate) a respective mobile device 100-1 and 100-2 (generically and individually referred to herein as "mobile device 100"). Mobile device 100-1 may have installed a media filtering app 115-1, a social media app 250-1, and a proximate identity app 260-1. Mobile device 100-2 may have installed a media filtering app 115-2 (115-1 and 115-2 generically and individually referred to herein as "media filtering app 115"), a social media app 250-2 (250-1 and 250-2 generically and individually referred to herein as "social media app 250), and a proximate identity app 260-2 (260-1 and 260-2 generically and individually referred to herein as "proximate identity app 260"). Mobile devices 100-1 and 100-2 may connect with network 240 via a wireless (shown) and/or wired (not shown) connection. Media filtering app 115 may perform the smart media file tagging and filtering as described below with respect to FIGS. 4 and 6. Social media app 250 may include software that enables mobile device 100 to access social media data of user 105 (or other users) at social media server(s) 220. Proximate identity app 260 may include software that enables mobile device to determine the identity of mobile users that are proximate to mobile device 100 (as described in further detail below).

App server(s) 210 may include one or more network devices that store applications for downloading by mobile device 100. The stored applications may include, for example, media filtering app 115, social media app 250 and/or proximate identity app 260. A user 105 may prompt mobile device 100 to download an app stored at app server(s) 210 via network 240.

Social media server(s) 220 may include one or more network devices that may each implement a different on-line social media service website(s). The different social media services may include, for example, Facebook, Twitter, LinkedIn, or similar on-line social media websites. Cloud storage 230 may include one or more network devices that may store data remotely for access by, for example, mobile devices 100-1 and 100-2. For example, media file collection 110 may be stored in cloud storage 230.

Network 240 may include one or more networks of various types including, for example, a Public Switched Telephone Network (PSTN), a wireless network, a local area network (LAN), a wide area network (WAN), a metropolitan area network (MAN), an intranet, or the Internet. The wireless network may include a satellite network, a Public Land Mobile Network (PLMN), or a wireless LAN or WAN (e.g., Wi-Fi).

The configuration of components of network environment 200 illustrated in FIG. 2 is for illustrative purposes. Other configurations may be implemented. Therefore, network environment 200 may include additional, fewer and/or different components that may be configured in a different arrangement from that depicted in FIG. 2. For example, two mobile devices 100-1 and 100-2 are shown for purposes of simplicity. However, multiple different mobile devices 100 may be present in network environment 200.

Figure 3:
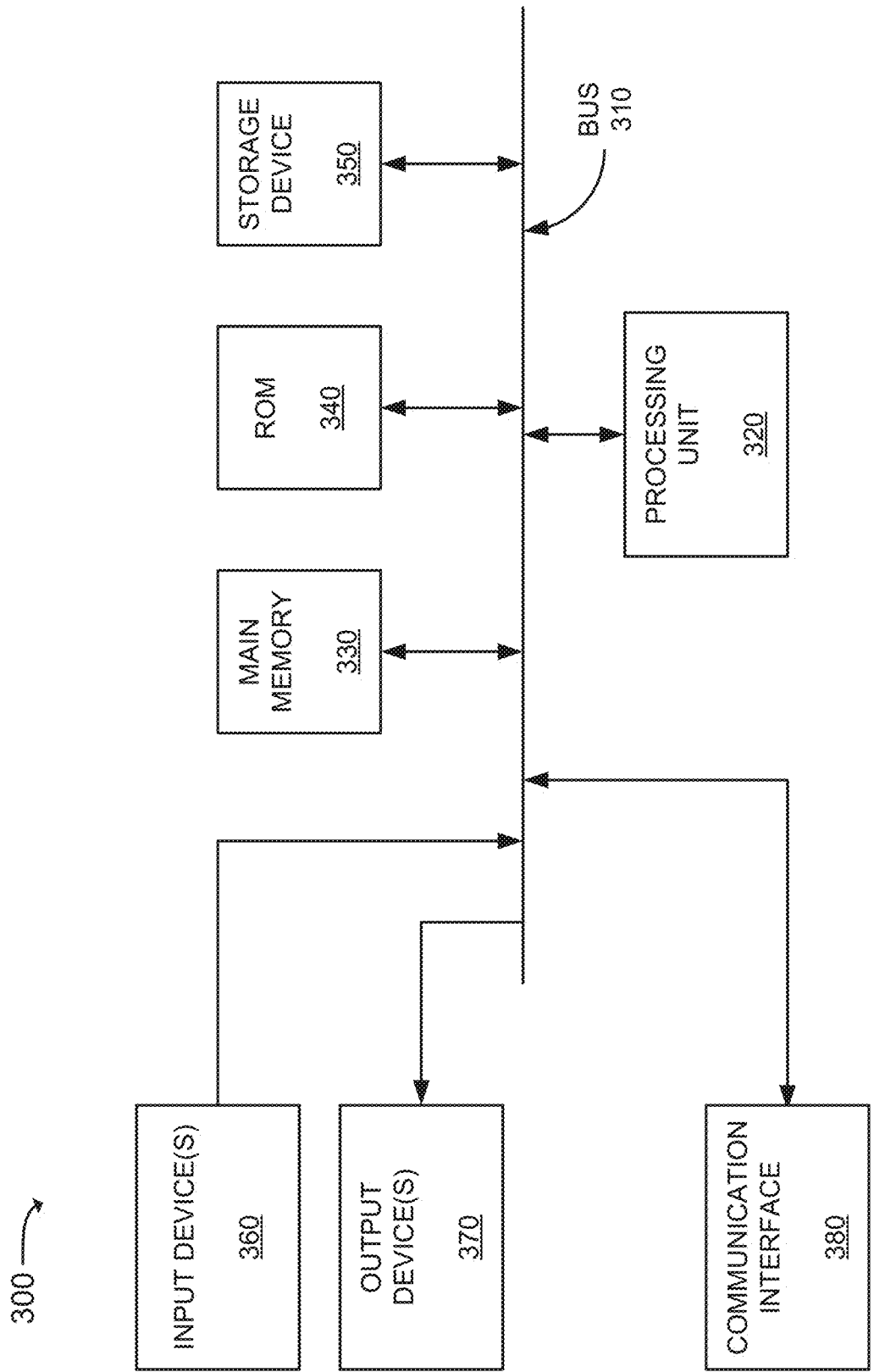
FIG. 3 is a diagram that depicts exemplary components of a device that may correspond to the application server(s), social media server(s), cloud storage and mobile device of FIG. 2.

FIG. 3 is a diagram that depicts exemplary components of a device 300. App server(s) 210, social media server(s) 220, cloud storage 230 and mobile device 100 may each have the same or similar components, in a same or similar configuration, to that of device 300 shown in FIG. 3. Device 300 may include a bus 310, a processing unit(s) 320, a main memory 330, a read only memory (ROM) 340, a storage device 350, an input device(s) 360, an output device(s) 370, and a communication interface(s) 380. Bus 310 may include a path that permits communication among the elements of device 300.

Processing unit(s) 320 may include one or more processors or microprocessors, or processing logic, which may interpret and execute instructions. Memory 330 may include a random access memory (RAM) or another type of dynamic storage device that may store information and instructions for execution by processing unit(s) 320. Read Only Memory (ROM) 340 may include a ROM device or another type of static storage device that may store static information and instructions for use by processing unit(s) 320. Storage device 350 may include a magnetic, electronic (e.g., flash memory drive), and/or optical recording medium (e.g., writable CD). Main memory 330, ROM 340 and storage device 350 may each be referred to herein as a "tangible non-transitory computer-readable medium."

Input device 360 may include one or more mechanisms that permit an operator (or user) to input information to device 300, such as, for example, a keypad or a keyboard, a display with a touch sensitive panel (e.g., a graphical user interface (GUI)), voice recognition and/or biometric mechanisms, etc. Output device 370 may include one or more mechanisms that output information to the operator, including a display, a speaker, a GUI, etc. Communication interface(s) 380 may include a transceiver that enables device 300 to communicate with other devices and/or systems. For example, if device 300 includes mobile device 100, communication interface(s) 380 may include one or more wireless transceivers for communicating with app server(s) 210, social media server(s) 220, or cloud storage 230 via network 240, or via a direct wireless connection. If device 300 includes app server(s) 210, social media server(s) 220, or cloud storage 230, communication interface(s) 380 may include a wired or wireless transceiver for communicating via network 240, or via a direct wired or wireless connection.

The configuration of components of device 300 illustrated in FIG. 3 is for illustrative purposes only. Other configurations may be implemented. Therefore, device 300 may include additional, fewer and/or different components, or differently arranged components, from those depicted in FIG. 3. For example, if device 300 includes mobile device 100, then input devices 360 of mobile device 100 may further include a camera and a microphone. The camera may generate and store images or video, and the microphone may sense sound and convert the sensed sound to electrical signals that permit the recording of audio.

Figure 4:
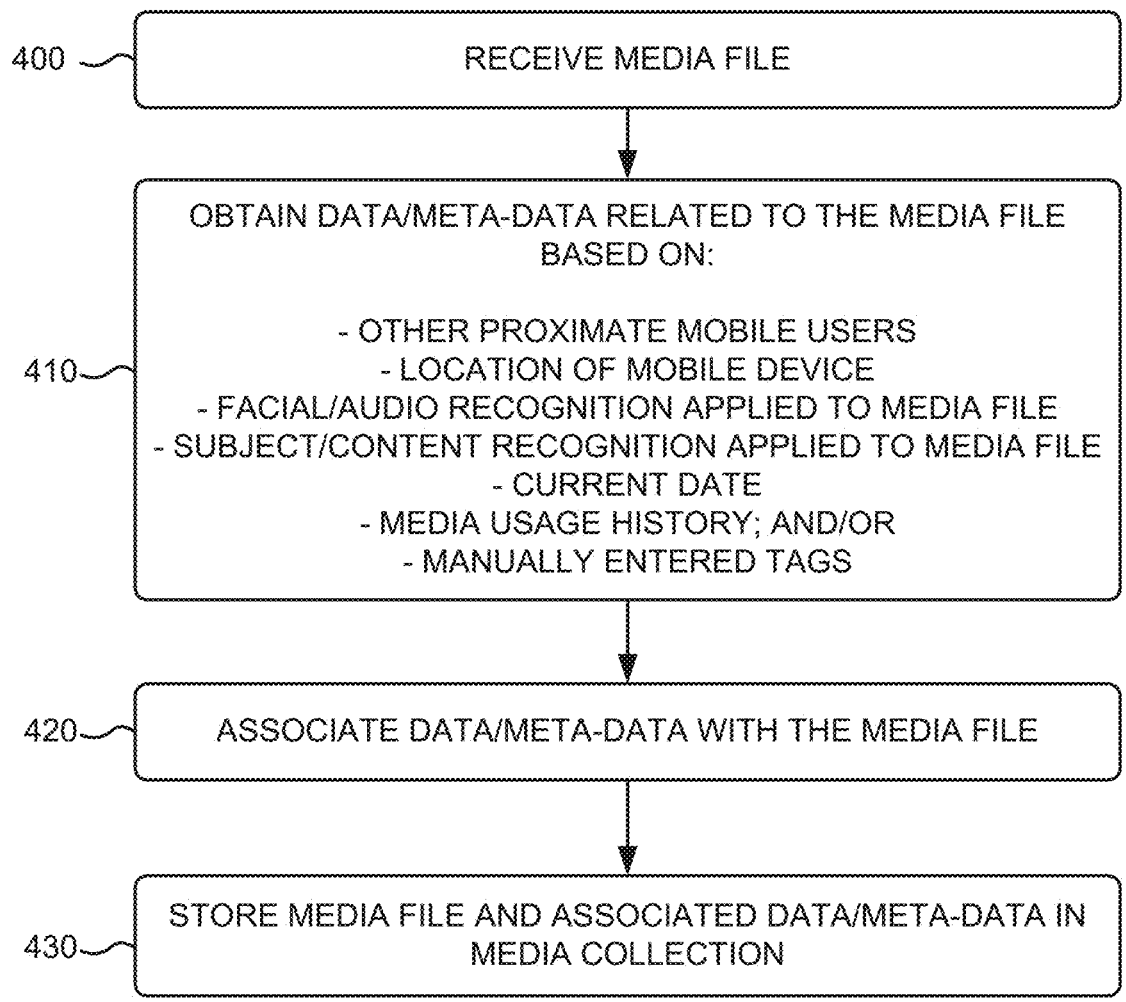
FIG. 4 is a flow diagram that illustrates an exemplary process for obtaining and associating data or meta-data with a media file at the mobile device of FIG. 1.

FIG. 4 is a flow diagram that illustrates an exemplary process for obtaining and associating data or meta-data with a media file (e.g., tagging the media file with data/meta-data) at mobile device 100. The exemplary process of FIG. 4 may be implemented by media filtering app 115 at mobile device 100, and may be repeated for each media file created, received or stored at mobile device 100. The exemplary process of FIG. 4 may be performed on each media file at a time at which the media file is created, received or stored, or may be performed at other times subsequent to storing (e.g., when shared with, or by, another user). The exemplary process of FIG. 4 may be repeated (e.g., performed in parallel) for each media file created, received or stored at mobile device 100.

The exemplary process may include media filtering app 115 at mobile device 100 receiving a media file (block 400). A camera at mobile device 100 may take a picture to generate a digital image of any type or format. Additionally, a microphone at mobile device 100 may record audio to generate a digital audio file of any type or format. Also, the camera, in conjunction with the microphone, at mobile device 100 may generate a digital video file. In other circumstances, the media file may be downloaded from a network device over network 240, or shared from another device via network 240 (e.g., via email).

The media filtering app 115 at mobile device 100 obtains data or meta-data related to the media file based on: 1) other proximate mobile users, 2) a location of mobile device 100, 3) facial and/or audio (e.g., voice) recognition analysis techniques applied to the media file, 4) subject/content recognition analysis techniques applied to the media file, 5) a current date, 6) a usage history of the media file, and/or 7) manually entered tags provided by user 105 (block 410), and associates the data or meta-data with the media file (block 420). Media filtering app 115, thus, "tags" each media file with the data or meta-data. The usage history of the media file may include data or metadata associated with whom the media file was shared, or who shared it, a date it was shared, etc. Media filtering app 115 may determine the data or meta-data to tag each media file based on one or more of 1) through 7) above. Thus, 1) through 7) above may be used alone or in combination with one another to tag a media mile.

Figure 5D:
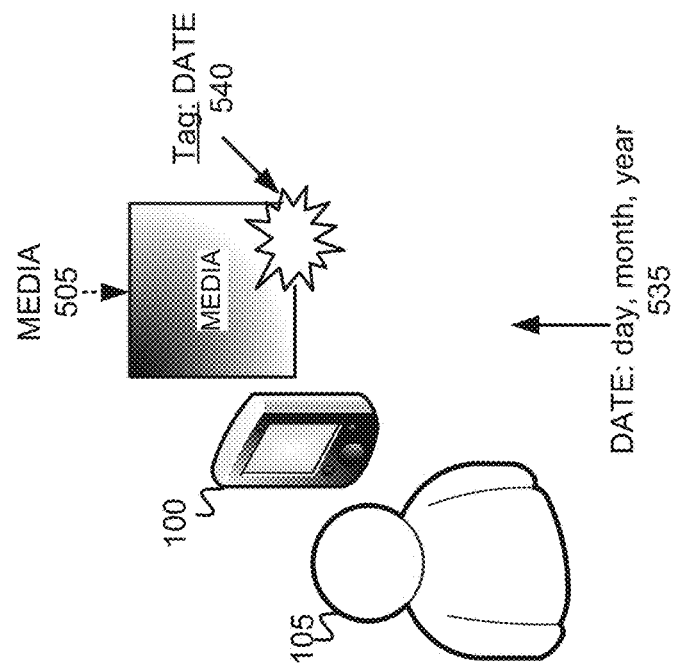

FIGS. 5A-5D depict various examples of mobile device 100 tagging a media file based on obtained data or meta-data. FIG. 5A shows mobile device 100 determining its current geographic location 500, and then tagging a media file 505 with a geo-location tag 510. For example, media file 505 may be tagged with location 500 at the time a picture or video is taken by a camera of mobile device 100. Mobile device 100 may, for example, determine its current location using Global Positioning System (GPS) techniques. Other types of geo-location determining techniques may, however, be used.

FIG. 5B shows mobile device 100 determining other mobile users 515-1 through 515-m that are proximate to a location 500 of mobile device 100 and user 105. Mobile device 100 may use, for example, proximate identity app 260 that identifies the other mobile users using short range wireless mechanisms (e.g., via BlueTooth or Wi-FI). Proximate identity app 260 may determine, for example, using the short range wireless mechanisms that one or more mobile users 515-1 through 515-m are within a proximate distance of mobile device 105. Proximate identity app 260 may cross-reference unique identifiers received from each of the mobile devices with identification information for the respective mobile users 515-1 through 515-m. Mobile device 100 may tag 520 media file 505 with data or metadata that includes an identification of the proximate mobile users.

Figure 5C:
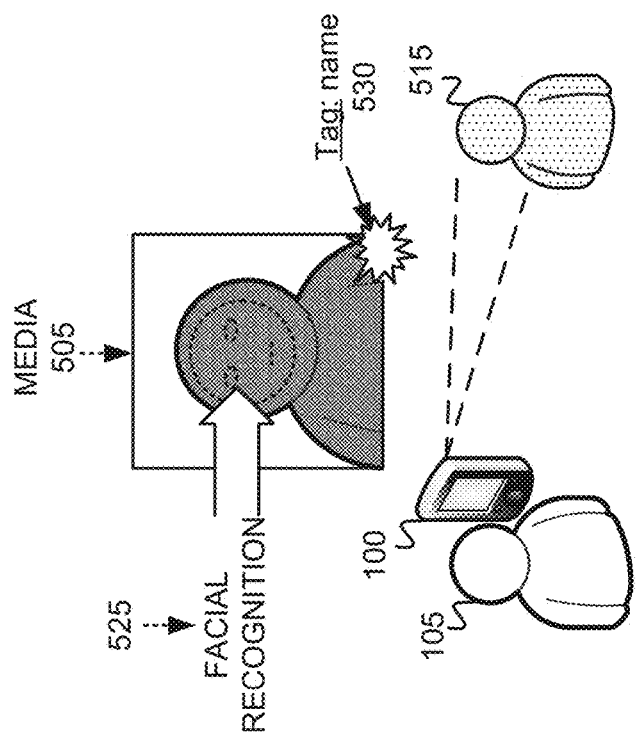

FIG. 5C depicts mobile device 100 being used to take a picture of an individual 515, and the use of facial recognition techniques 525, employed by media filtering app 115, to analyze facial features contained in media file 505 to identify a name of individual 515. Mobile device 100 may tag 530 media file 505 with the name of individual 515 identified using facial recognition (or voice recognition if media file 505 includes audio). The name may be obtained, for example, using images and corresponding names obtained from social media server(s) 220 via social media app 250. Though not shown in FIG. 5C, multiple individuals contained in media file 505 may be identified using facial and/or voice recognition techniques.

FIG. 5D depicts mobile device 100 determining a current date 535, including the day, month and year, and tagging 540 media file 505 with the determined date. The examples of each of FIGS. 5A-5C, and other techniques for obtaining data or metadata for tagging media files, may be used alone, or in conjunction with one another. The tag associated with each media file may, therefore, have one or more items of data or meta-data.

Returning to FIG. 4, the media filtering app 115 at mobile device 100 may store the media file, and the associated data or meta-data, in a media collection (block 430). Mobile device 100 may store the media file in local memory (e.g., main memory 330), or may store the media file in a media collection external to mobile device 100. For example, mobile device 100 may send the tagged media file for storage in a media collection at cloud storage 230.

Figure 6:
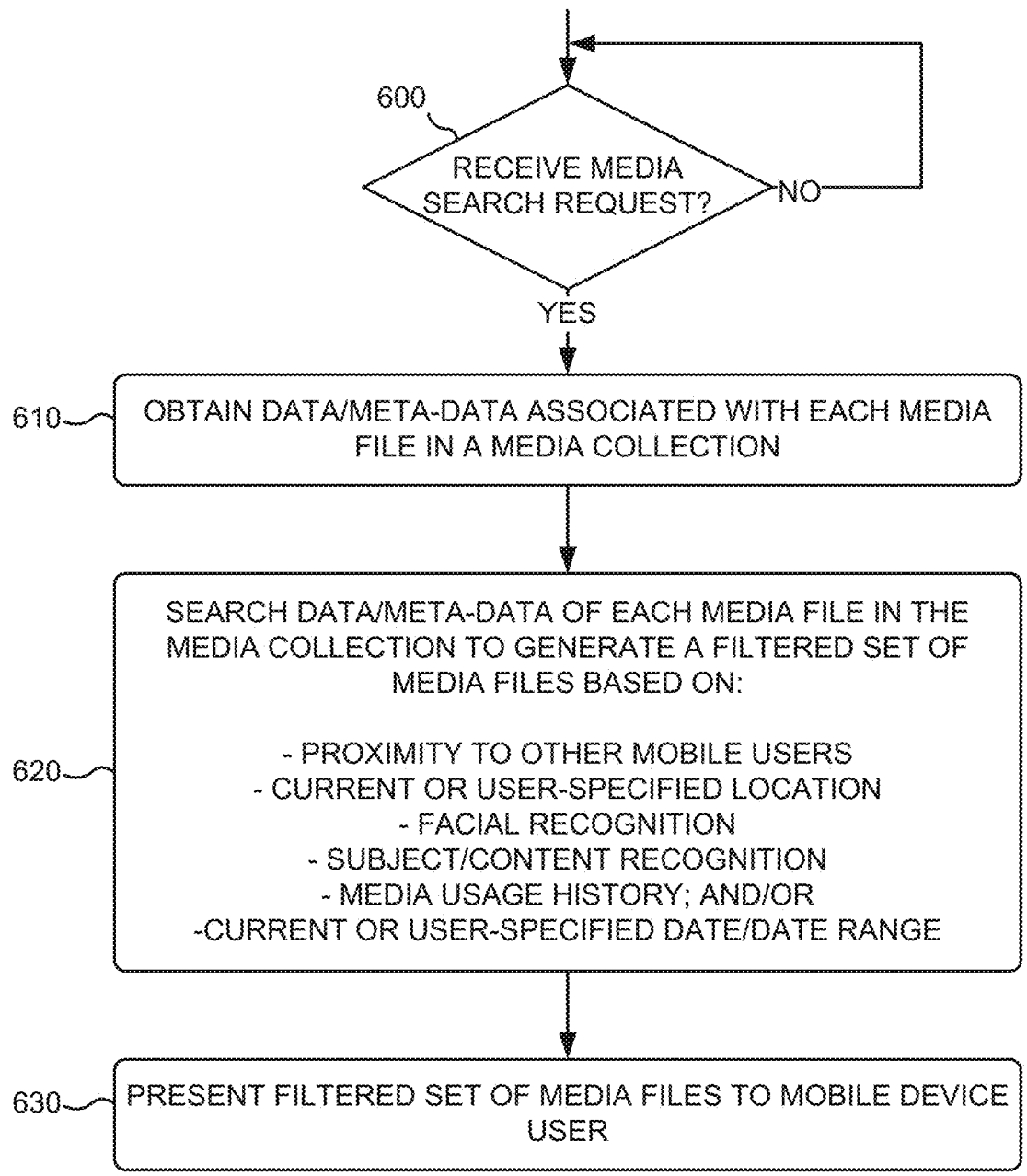
FIG. 6 is a flow diagram that illustrates an exemplary process for searching a collection of media files, based on data/meta-data tags associated with the media files, and filtering the media files to produce a subset of the collection of the media items.

FIG. 6 is a flow diagram that illustrates an exemplary process for searching a collection of media files, based on data/meta-data tags associated with the media files, and filtering the media files to produce a subset of the collection of the media files. The exemplary process of FIG. 6 may be implemented by media filtering app 115 at mobile device 100.

The exemplary process includes media filtering app 115 at mobile device 100 determining if a media search request has been received (block 600). Referring to the exemplary user interface 800 of mobile device 100 of FIG. 8, user 105 may select a search button 805 to initiate a search of a collection of media items.

The media filtering app 115 at mobile device 100 obtains data or meta-data associated with each media file in a media collection (block 610). Each media file in the media collection may have been previously tagged with data or meta-data, as described with respect to blocks 410 and 420 of FIG. 4, and media filtering app 115 may retrieve that data or meta-data from memory.

The media filtering app 115 at mobile device 100 searches the data or meta-data of each media file in the media collection to generate a filtered set of media files based on: 1) other identified mobile users that are proximate to mobile device 100, 2) a current or user-specified location, 3) a determination of an identity of an individual in a vicinity of mobile device 100 using facial and/or audio (e.g., voice) recognition analysis techniques, 4) a determination of a subject or content in the vicinity of mobile device using subject/content recognition analysis techniques, 5) media usage history, and/or 6) a current or user-specified date or date range (block 620). The search of the data or meta-data of each media file in the media collection may further be based on factors other than, or in addition to, those described above with respect to block 620. Media filtering app 115 may search the tagged data/meta-data of each media file in the media file collection based on one or more of 1) through 6) above. Thus, 1) through 6) above may be used alone, or in combination with one another, to search and filter the media file collection.

Figure 7A:
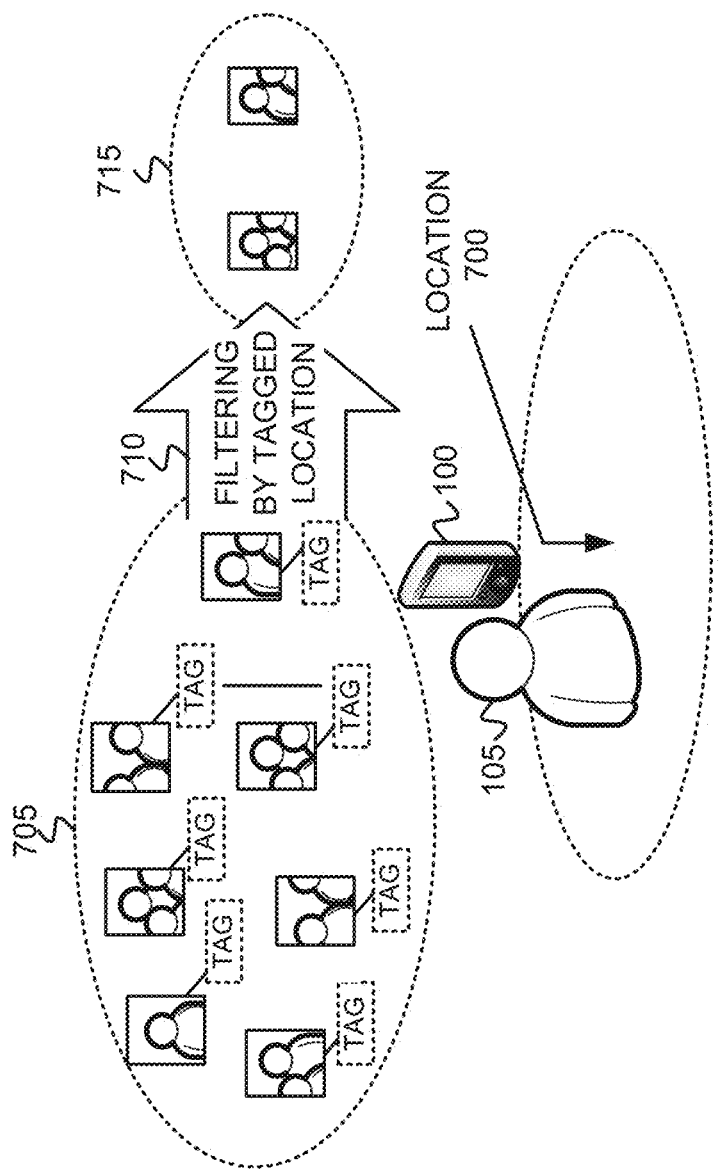
FIGS. 7A-7D depict examples of the mobile device of FIG. 1 searching data/meta-data tags associated with media files of a collection of media files to filter the media files.

FIGS. 7A-7D depict various examples of mobile device 100 searching data/meta-data tags associated with media files of a collection 705 of media files to filter the media files. FIG. 7A shows mobile device 100 determining its current location 700, and then comparing location 700 with location tags associated with media files in collection 705 to filter 710 the media files. The comparison includes identifying media files having location tags that are the same as, or within a certain distance of, location 700. The location tags may have been associated with media files in blocks 410 and 420 of FIG. 4. Filtering 710 of collection 705 by tagged location enables media filtering app 115 to generate a filtered set 715 of media files that includes fewer media files than collection 705 that may more easily be manually searched through by user 105. Mobile device 100 may, for example, determine location 700 using Global Positioning System (GPS) techniques. Other types of geo-location determining techniques may, however, be used. Alternatively, user 105 may manually select a geographic location via a user interface of mobile device. For example, as depicted in FIG. 8, a location may be manually entered in a field 825 of user interface 800 of mobile device 100 using a keypad 810. The manually entered location could be any location that may be related to one or more media files in the collection of media files.

Figure 7B:
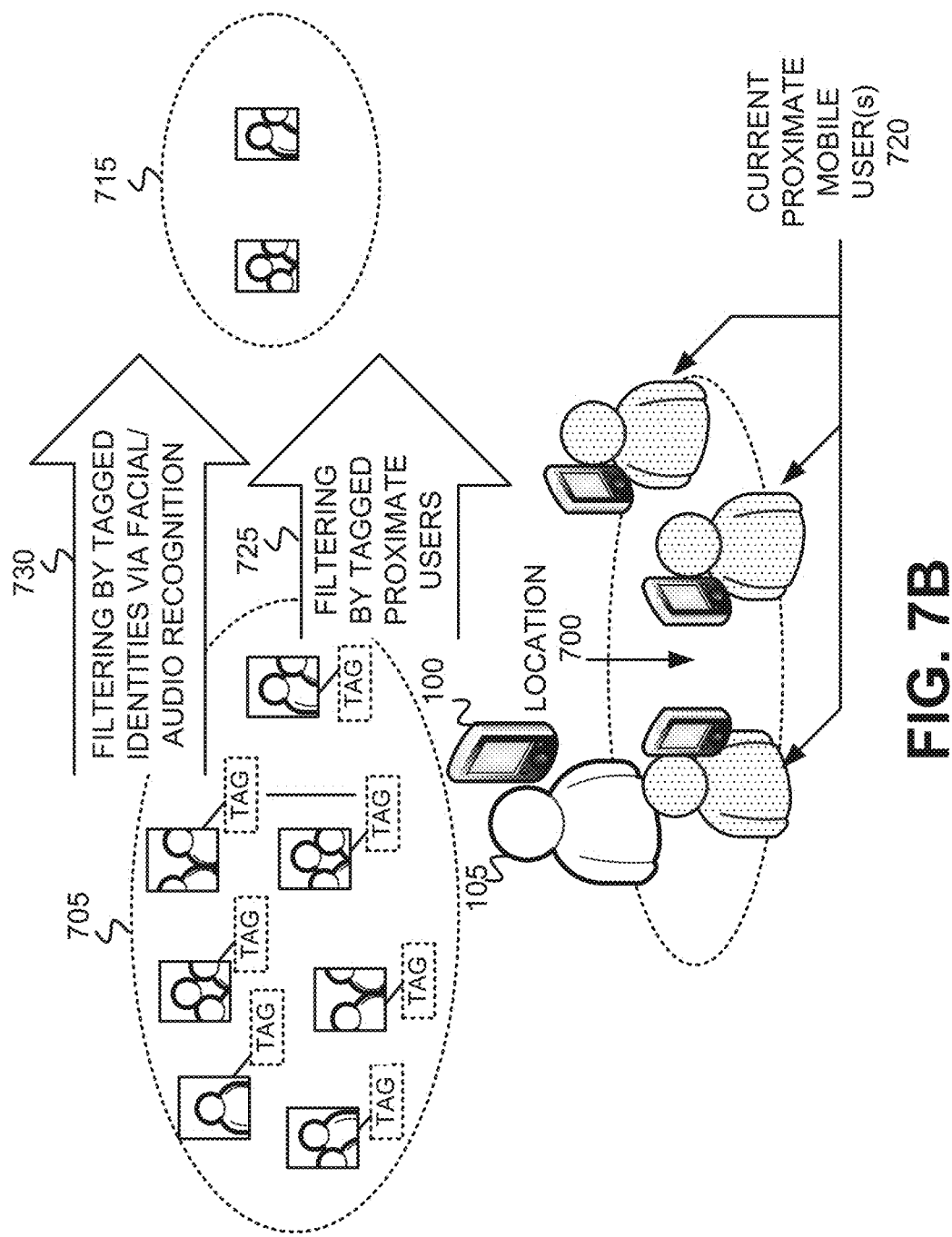
Figure 8:
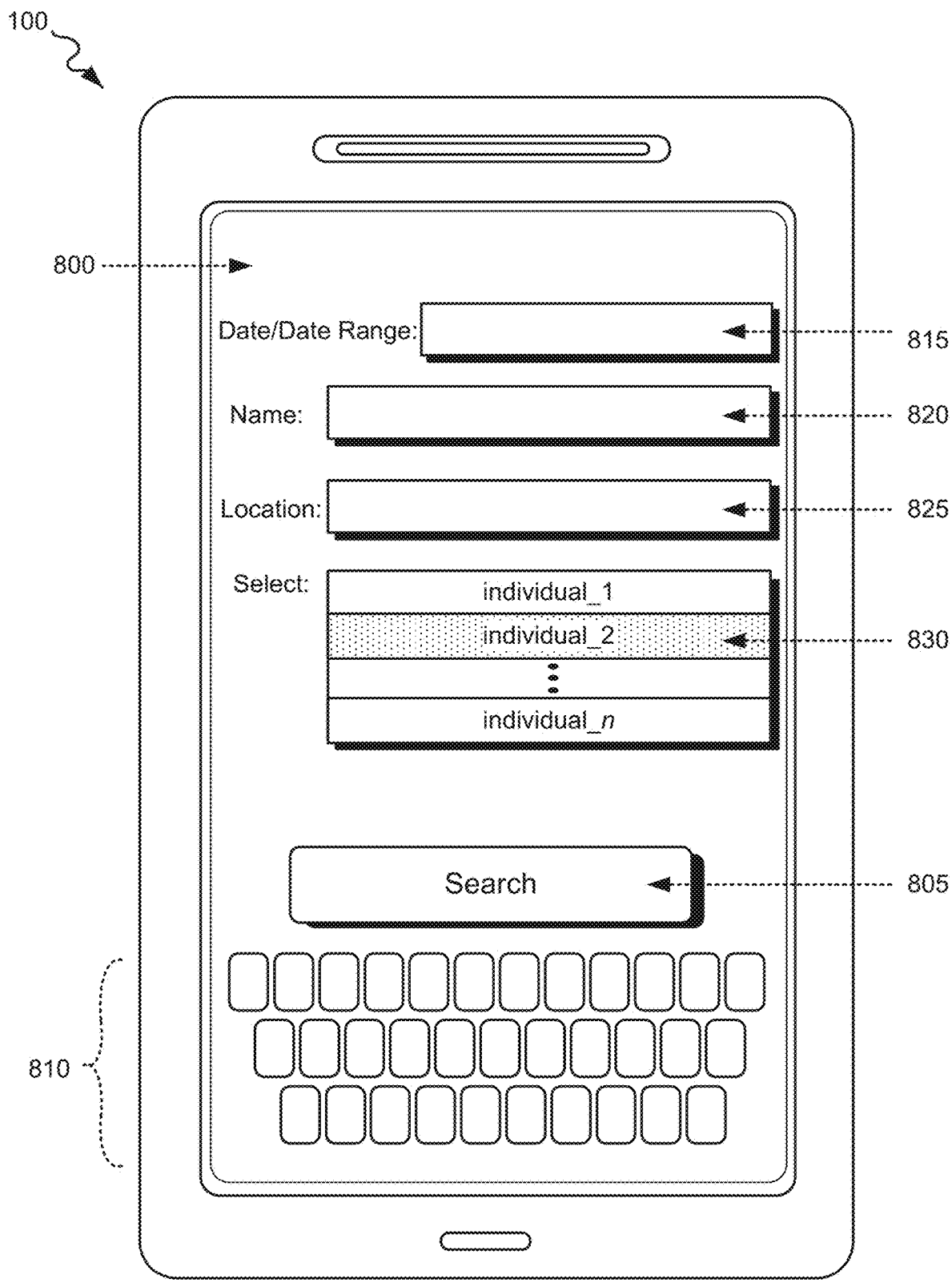
FIG. 8 is a diagram that depicts an exemplary user interface implemented at the mobile device of FIG. 1.

FIG. 7B depicts mobile device 100 identifying mobile users 720 that are currently in proximity to a location 700 of mobile device 100. Mobile device 100 may use, for example, proximate identity app 260 to identify the other mobile users 720 using short range wireless mechanisms (e.g., via BlueTooth or Wi-Fi). Proximate identity app 260 may determine, using the short range wireless mechanisms, that one or more mobile users 720 are within a proximate distance of location 700 of mobile device 100. Proximate identity app 260 may cross-reference unique identifiers received from each of the proximate mobile devices with identification information for the respective mobile users to identify each of the proximate mobile users. Media filtering app 115 may then compare the identified mobile users with mobile user IDs contained in tags associated with media files in collection 705 to filter 725 the media files. For example, the tags of other proximate mobile users may have been associated with media files in blocks 410 and 420 of FIG. 4. As another example, the media file(s) may have been tagged with identity information obtained from facial and/or audio (e.g., voice) recognition analysis techniques applied to the media file(s). The tagged identity information may be compared with the identities of proximate mobile users 720 to identify media files having tags that match the identities of the proximate mobile users 720. Filtering 725/730 of collection 705 by tagged proximate mobile users or by facially recognized identities enables media filtering app 115 to generate a filtered set 715 of media files that includes fewer media files than collection 705 that may more easily be manually searched by user 105.

Alternatively, user 105 may manually select one or more individuals via a user interface of mobile device. For example, as depicted in FIG. 8, one or more individuals may be selected via a field/drop-down menu 830 of user interface 800 of mobile device 100. The manually entered individual(s) can be any individual that may be related to one or more media files in the collection of media files. The list of individuals may be retrieved from a contacts list, or favorites, list, maintained by mobile device 100.

Figure 7C:
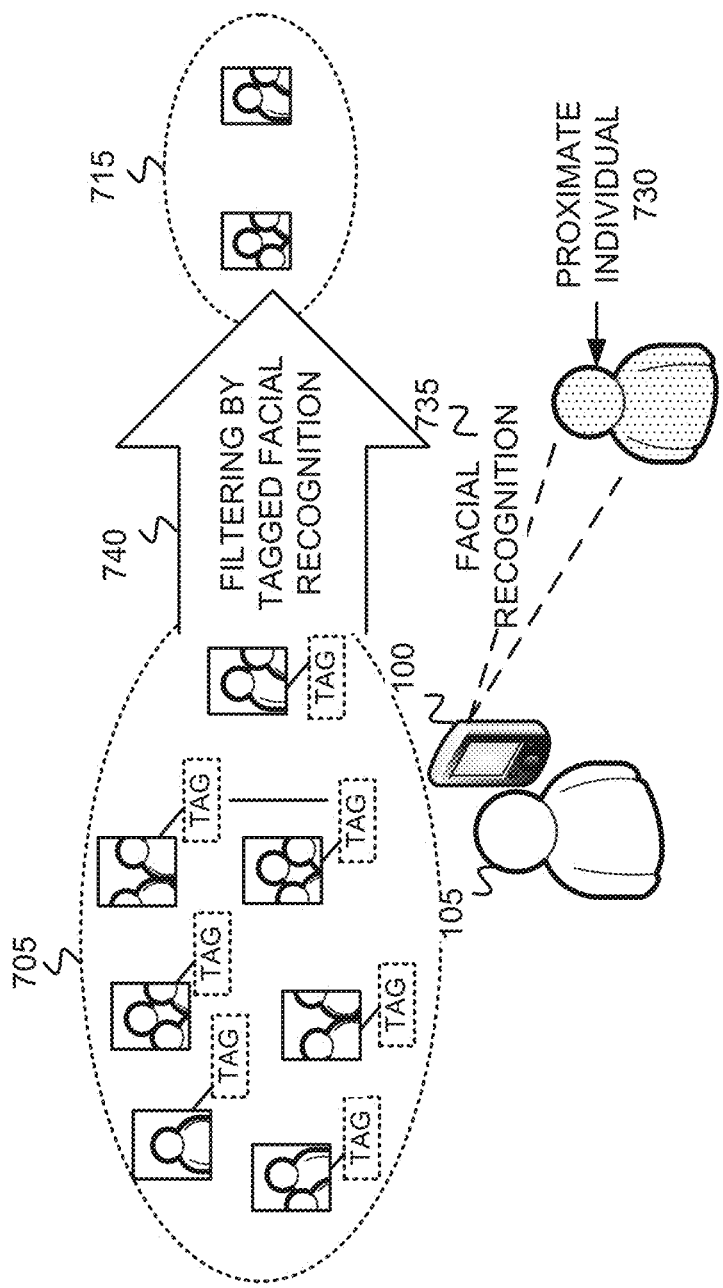

FIG. 7C depicts user 105 taking a picture of an individual 730 that is in proximity to mobile device 100 using a camera of mobile device 100. Media filtering app 115 may then use facial recognition techniques 735 to analyze the generated media file to identify individual 730. Media filtering app 115 may then compare the identified individual 730 with identity information (e.g., names and/or mobile user IDs) contained in tags associated with media files in collection 705 to filter 740 the media files. Filtering 740 of collection 705 by tagged mobile user/individual identity information enables media filtering app 115 to generate a filtered set 715 of media files that includes fewer media files than collection 705 that may more easily be manually searched by user 105.

Figure 7D:
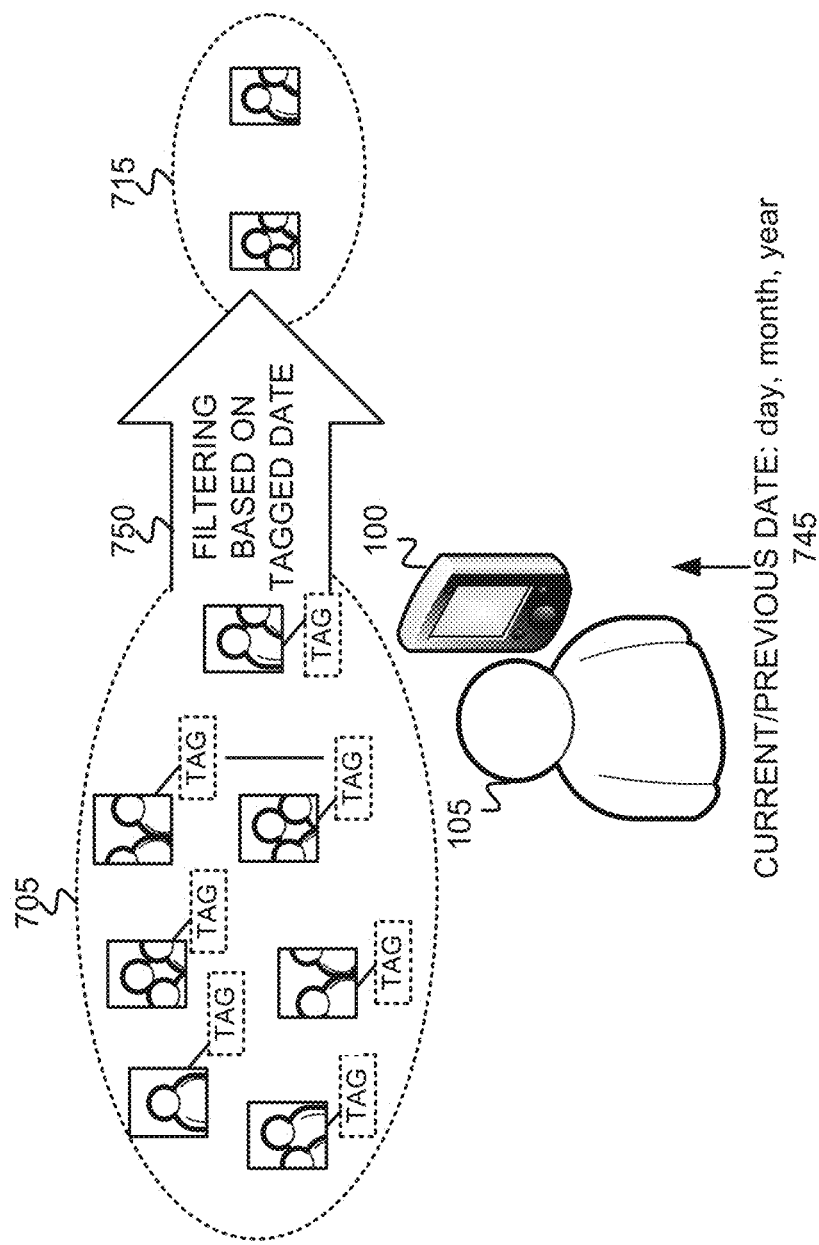

FIG. 7D depicts user 105 mobile device 100 obtaining a date 745, including a day, month and year. Mobile device 100 may obtain a current date from device in network 240 that keeps time, or from an internally maintained clock/calendar. Media filtering app 115 of mobile device 100 may compare date 745 with date tags associated with media files in collection 705 to filter 750 the media files. The date tags may have been associated with media files in blocks 410 and 420 of FIG. 4. Filtering 750 of collection 705 by tagged date enables media filtering app 115 to generate a filtered set 715 of media files that includes fewer media files than collection 705 that may more easily be manually searched through by user 105.

Alternatively, user 105 may manually select a date or a date range via a user interface of mobile device. For example, as depicted in FIG. 8, a date or date range may be manually entered in a field 815 of user interface 800 of mobile device 100. The manually entered date or date range could be any date that may be related to one or more media files in the collection of media files.

The media filtering app 115 at mobile device 100 presents the filtered set of media files to user 105 of mobile device 100 (block 630). Media filtering app 115 may present the filtered set of media files via a user interface of mobile device 100, such as, for example, a touch screen user interface. User 105 may manually search through (e.g., scroll) the filtered set of media files to determine if a desired media file has been found. The blocks 600-620 of FIG. 6 may be repeated each time user 105 conducts a search of media files in a media file collection 110.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4 and 6, the order of the blocks may be varied in other implementations. Moreover, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
generating, at a mobile device, first media files;
automatically tagging each of the first media files with tags, comprising data or meta-data, based on one or more of a plurality of factors, wherein the plurality of factors includes:
other mobile users proximate to the mobile device,
a current location of the mobile device,
facial recognition analysis applied to each of the first media files,
subject or content recognition analysis applied to each of the first media files,
a current date, and
a usage history associated with each of the first media files;
storing the tagged first media files by storing the first media files and the data or meta-data associated with the first media files in a media collection associated with the mobile device;
presenting a user interface that includes a plurality of options for searching the first media files, wherein the plurality of options includes:
an option for searching the first media files based on a date or a date range related to one or more media files of the first media files,
an option for searching the first media files based on a name related to the one or more media files of the first media files,
an option for searching the first media files based on a location related to the one or more media files of the first media files, and
an option for searching the first media files based on selecting one or more individuals via a drop-down menu, wherein each individual of the one or more individuals is related to at least one first media file of the first media files, and wherein names of the one or more individuals are stored in a contacts list stored at the mobile device;
receiving, via the user interface, a user request to search the first media files, wherein the user request indicates that the first media files are to be searched to identify one or more first media files that are tagged with data or meta-data associated with other mobile device users that are proximate to the mobile device at a time when the user request was received;
identifying that one or more third mobile devices are within the particular distance of the mobile device in response to receiving the user request to search the first media files;
receiving third identifiers for the one or more third mobile devices;
cross-referencing the received third identifiers to determine identification information for one or more third individuals associated with the one or more third mobile devices;
searching, based on the identification information for the one or more third individuals, the tags, comprising the data or meta-data, to generate a filtered set of media files, wherein the filtered set of media files includes second media files associated with the one or more third individuals that are within the particular distance of the mobile device at the time when the user request was received; and
presenting the filtered set of media files to a user of the mobile device.

2. The method of claim 1, wherein searching the tags is based on:
a geographic location,
a determination of an identity of another individual in a vicinity of the mobile device using a facial recognition media analysis technique,
a determination of a subject or content related to a vicinity of the mobile device using a subject or recognition media analysis technique,
a usage history associated with one or more of the first media files, or
a current or previous date.

3. The method of claim 2, wherein searching the tags further comprises:
comparing the geographic location, the determined identity of the other individual, the determined subject or content, the usage history, or the current or previous date with the tags comprising the data or meta-data; and
generating the filtered set of media files based on the comparison.

4. The method of claim 1, where each of the first media files comprises an image file or a video file.

5. The method of claim 1, wherein generating the first media files comprises:
receiving input from a camera of the mobile device to create each of the first media files.

6. The method of claim 1, wherein generating the first media files comprises:
receiving input from a camera and a microphone of the mobile device to create each of the first media files.

7. The method of claim 1, wherein storing the tagged first media files comprises:
storing the tagged first media files in the mobile device, in a device external to the mobile device, or in cloud storage.

8. A mobile device, comprising:
a user interface;
a communication interface;
a camera;
a memory; and
a processing unit configured to:
cause a media filtering application to be downloaded via the communication interface from a remote network device over a network;
cause a proximate identity application to be downloaded via the communication interface from a second remote network device over the network;
receive, from the camera, media files at the mobile device;
execute the media filtering application to:
automatically tag each of the media files with data or meta-data related to one or more of a plurality of factors,
wherein the plurality of factors includes:
other mobile users proximate to the mobile device,
a current location of the mobile device,
facial recognition analysis applied to each of the media files,
subject or content recognition analysis applied to each of the media files,
a current date, and
a usage history associated with each of the media files; and store the tagged media files by storing the media files and the data or meta-data associated with the media files in the memory;
present, on the user interface, a plurality of options for searching the tagged media files, wherein the plurality of options includes:
an option for searching the media files based on a date or a date range related to one or more media files of the media files,
an option for searching the media files based on a name related to the one or more media files of the media files,
an option for searching the media files based on a location related to the one or more media files of the media files, and
an option for searching the media files based on selecting one or more individuals via a drop-down menu, wherein each individual of the one or more individuals is related to at least one media file of the media files, and wherein names of the one or more individuals are stored in a contacts list stored at the mobile device;
receive, via the user interface, a user request to search the media files, wherein the user request indicates that the media files are to be searched to identify one or more media files that are tagged with data or meta-data associated with other mobile device users that are proximate to the mobile device at a time when the user request was received;
execute the proximate identity application in response to receiving the user request to search the media files to:
identify that one or more third mobile devices are within the particular distance of the mobile device;
receive identifiers for the one or more third mobile devices; and
determine identification information for one or more second mobile device users associated with the one or more third mobile devices; and
further execute the media filtering application to:
search, responsive to the user request and based on the one or more second mobile device users, the tags, comprising the data or meta-data, to generate a filtered set of media files, wherein the filtered set of media files includes second media files associated with the one or more second mobile device users that are within the particular distance of the mobile device at the time when the user request was received; and
display, via the user interface, the filtered set of media files.

9. The mobile device of claim 8, wherein searching the tags is based on:
a geographic location,
a determination of an identity of another individual in a vicinity of the mobile device using a facial recognition media analysis technique,
a determination of a subject or content related to a vicinity of the mobile device using a subject or recognition media analysis technique,
a usage history associated with one or more of the media files, or
a current or previous date.

10. The mobile device of claim 9, wherein, when searching the tags, the processing unit is further configured to:
compare the geographic location, the determined identity of the other individual, the determined subject or content, the usage history, and the current or previous date with the tags comprising the data or meta-data; and
generate the filtered set of media files based on the comparison.

11. The mobile device of claim 8, wherein each of the media files comprises an image file or a video file.

12. The mobile device of claim 8, wherein, when receiving the media files, the processing unit is configured to:
receive input from the camera of the mobile device to create each of the media files.

13. The mobile device of claim 8, wherein, when receiving the media files, the processing unit is configured to:
receive input from the camera and a microphone of the mobile device to create each of the media files.

14. The mobile device of claim 8, wherein, when storing the tagged media files, the processing unit is configured to:
store the tagged media files in the memory of the mobile device, in a device external to the mobile device, or in cloud storage.

15. A non-transitory computer-readable medium containing instructions executable by at least one processor, the computer-readable medium comprising:
one or more instructions for generating, at a mobile device, first media files;
one or more instructions for automatically tagging each of the first media files with tags, comprising data or meta-data, based on one or more of a plurality of factors,
wherein the plurality of factors includes:
other mobile users proximate to the mobile device,
a current location of the mobile device,
facial recognition analysis applied to each of the first media files,
subject or content recognition analysis applied to each of the first media files,
a current date, and
a usage history associated with each of the first media files;
one or more instructions for storing the tagged first media files by storing the first media files and the data or meta-data associated with the first media files in a media collection associated with the mobile device;
one or more instructions for presenting a user interface that includes a plurality of options for searching the first media files, wherein the plurality of options includes:
an option for searching the first media files based on a date or a date range related to one or more media files of the first media files,
an option for searching the first media files based on a name related to the one or more media files of the first media files,
an option for searching the first media files based on a location related to the one or more media files of the first media files, and
an option for searching the first media files based on selecting one or more individuals via a drop-down menu, wherein each individual of the one or more individuals is related to at least one first media file of the first media files, and wherein names of the one or more individuals are stored in a contacts list stored at the mobile device;
one or more instructions for receiving, via the user interface, a user request to search the first media files, wherein the user request indicates that the first media files are to be searched to identify one or more first media files that are tagged with data or meta-data associated with other mobile device users that are proximate to the mobile device at a time when the user request was received;

one or more instructions for identifying that one or more third mobile devices are within the particular distance of the mobile device in response to receiving the user request to search the first media files;

one or more instructions for receiving third identifiers for the one or more third mobile devices;

one or more instructions for cross-referencing the received third identifiers to determine identification information for one or more third individuals associated with the one or more third mobile devices;

one or more instructions for searching, based on the identification information for the one or more third individuals, the tags, comprising the data or meta-data, to generate a filtered set of media files, wherein the filtered set of media files includes second media files associated with the one or more third individuals that are within the particular distance of the mobile device at the time when the user request was received; and one or more instructions for presenting the filtered set of media files to a user of the mobile device.

16. The non-transitory computer-readable medium of claim 15, wherein searching the tags is based on:
a geographic location,
a determination of an identity of another individual in a vicinity of the mobile device using a facial recognition media analysis technique,
a determination of a subject or content related to a vicinity of the mobile device using a subject or recognition media analysis technique,
a usage history associated with one or more of the first media files, or
a current or previous date.

17. The non-transitory computer-readable medium of claim 16, wherein the one or more instructions for searching the tags further comprise:
one or more instructions for comparing the geographic location, the determined identity of the other individual, the determined subject or content, the usage history, and the current or previous date with the tags comprising the data or meta-data; and
one or more instructions for generating the filtered set of media files based on the comparison.

18. The non-transitory computer-readable medium of claim 15, wherein each of the first media files comprises an image file or a video file.

19. The non-transitory computer-readable medium of claim 15, wherein the one or more instructions for generating the first media files comprises:
one or more instructions for receiving input from a camera of the mobile device to create each of the first media files, or
one or more instructions for receiving input from the camera and a microphone of the mobile device to create each of the first media files.

20. The non-transitory computer-readable medium of claim 15, wherein the one or more instructions for storing the tagged first media files comprises:
one or more instructions for storing the tagged first media files in the mobile device, in a device external to the mobile device, or in cloud storage.

* * * * *